(12) United States Patent
Nakamura et al.

(10) Patent No.: US 9,342,075 B2
(45) Date of Patent: May 17, 2016

(54) APPARATUS, METHOD AND COMPUTER READABLE MEDIA FOR CALCULATING STATUS, AND MOVABLE BODY

(71) Applicant: Furuno Electric Co., Ltd., Nishinomiya (JP)

(72) Inventors: Hiraku Nakamura, Nishinomiya (JP); Naomi Fujisawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/339,248

(22) Filed: Jul. 23, 2014

(65) Prior Publication Data

US 2015/0032304 A1   Jan. 29, 2015

(30) Foreign Application Priority Data

Jul. 24, 2013   (JP) ................................. 2013-153402

(51) Int. Cl.

| | |
|---|---|
| *G01S 19/54* | (2010.01) |
| *G01S 19/52* | (2010.01) |
| *G01S 3/14* | (2006.01) |
| *G01S 3/48* | (2006.01) |
| *G01S 19/39* | (2010.01) |
| *G01S 5/02* | (2010.01) |
| *G05D 1/02* | (2006.01) |

(52) U.S. Cl.
CPC .............. *G05D 1/0206* (2013.01); *G01S 3/143* (2013.01); *G01S 3/48* (2013.01); *G01S 19/52* (2013.01); *G01S 19/54* (2013.01); *G01S 5/0247* (2013.01); *G01S 19/39* (2013.01)

(58) Field of Classification Search
CPC ......... G01S 3/143; G01S 3/48; G01S 5/0247; G01S 19/39; G01S 19/52; G01S 19/54; G05D 1/0206
See application file for complete search history.

(56) References Cited

U.S. PATENT DOCUMENTS

| | | | | |
|---|---|---|---|---|
| 6,421,003 | B1 * | 7/2002 | Riley et al. | ............... 342/357.38 |
| 7,136,751 | B2 * | 11/2006 | Pinto et al. | .................... 701/470 |
| 8,311,730 | B2 * | 11/2012 | Neff | ............................. 701/300 |
| 8,521,179 | B2 * | 8/2013 | Hasegawa | .................. 455/456.1 |
| 8,633,854 | B2 * | 1/2014 | Fenton | ..................... 342/357.37 |
| 2013/0207845 | A1 * | 8/2013 | Eidloth et al. | ................ 342/465 |

FOREIGN PATENT DOCUMENTS

JP   2008014721 A   1/2008

OTHER PUBLICATIONS

European Patent Office, European search report of EP14178125.2, Jan. 30, 2015, Germany, 6 pages.

* cited by examiner

*Primary Examiner* — Todd Melton

(74) *Attorney, Agent, or Firm* — Alleman Hall McCoy Russell & Tuttle LLP

(57) ABSTRACT

A status calculating apparatus is provided. The apparatus includes three or more antennas disposed at different positions on a movable body, each antenna receiving positioning signals, correlators for calculating carrier wave phase differences for every antenna based on correlation of the positioning signals with a replica signal, carrier wave phase measurement value calculating modules for calculating carrier wave phase measurement values, a baseline vector calculating module for calculating baseline vectors based on the carrier wave phase measurement values, and an attitude angle calculating module for calculating a yaw angle for every baseline vector and calculating a representative yaw angle based on the plurality of calculated yaw angles.

16 Claims, 18 Drawing Sheets

APPARATUS, METHOD AND COMPUTER READABLE MEDIA FOR CALCULATING STATUS, AND MOVABLE BODY

CROSS-REFERENCE TO RELATED APPLICATION(S)

This application claims priority under 35 U.S.C. §119 to Japanese Patent Application No. 2013-153402, which was filed on Jun. 24, 2013 the entire disclosure of which is hereby incorporated by reference.

TECHNICAL FIELD

The present invention generally relates to a status calculating apparatus, which calculates a moving status of a movable body, such as a ship, including an attitude angle, a speed, and a position.

BACKGROUND OF THE INVENTION

Conventionally, various apparatuses which calculate a traveling status (moving status) of a movable body have been proposed. For example, JP2008-014721A discloses an attitude calculating apparatus attached to a ship. An attitude calculating apparatus generally calculates an attitude angle of a ship by using positional information of a plurality of antennas disposed at different positions on the ship.

In the attitude calculating apparatus in JP2008-014721A, a plurality of antennas are arranged such that magnitudes and directions of baseline vectors, each connecting the antennas, are different from each other. The attitude calculating apparatus in JP2008-014721A selects two antennas with longest baseline lengths among the plurality of antennas receiving positioning signals, in other words, the plurality of antennas which can perform positioning. The attitude calculating apparatus in JP2008-014721A calculates an attitude angle of the ship based on the obtained positions of the selected two antennas.

As described above, with the conventional attitude calculating apparatus, since the attitude angle is calculated by using the two antennas with the longest baseline lengths as much as possible, the arrangement area for the attitude calculating apparatus on the movable body becomes large. This is for improving the calculation accuracy of the attitude angle since it is generally known that the calculation accuracy of the attitude angle degrades as the baseline becomes shorter.

However, there are cases where the arrangement area for the attitude calculating apparatus on the movable body is limited, and in such cases, a high calculation accuracy of the attitude angle cannot be expected.

SUMMARY OF THE INVENTION

Therefore, the present invention is made in view of the above situations, and mainly aims to provide a compact status calculating apparatus, which can calculate a moving status of a movable body, including an attitude angle, highly accurately. The present invention also aims to provide status calculating method and program, which can achieve a status calculating apparatus having such characteristics.

According to one aspect of the present invention, a status calculating apparatus is provided which includes a plurality of antennas, correlators, carrier wave phase measurement value calculating modules, a baseline vector calculating module, and an attitude angle calculating module. The plurality of antennas include three or more antennas and are disposed at different positions on a movable body, and each antenna receives a plurality of positioning signals. The correlators calculate carrier wave phase differences for every antenna based on correlation of the plurality of positioning signals with a replica signal of the positioning signal. The carrier wave phase measurement value calculating modules calculate carrier wave phase measurement values, each carrier wave phase measurement value being an integrated value of the carrier wave phase differences. The baseline vector calculating module calculates a plurality of baseline vectors based on the carrier wave phase measurement values. The attitude angle calculating module calculates a yaw angle for every baseline vector and calculates a representative yaw angle based on the plurality of calculated yaw angles, as an attitude angle.

With this configuration, since the representative yaw angle is calculated with the plurality of baseline vectors, the representative yaw angle can be calculated highly accurately. Thereby, the attitude angle including the representative yaw angle can be calculated highly accurately.

Further, the attitude angle calculating module may calculate the yaw angle for every baseline vector based on a representative pitch angle and a representative roll angle, the representative pitch angle and the representative roll angle being the attitude angle.

With this configuration, the specific method for calculating the yaw angle using the baseline vector is indicated.

Further, the attitude angle calculating module may calculate a roll angle for every baseline vector based on the representative pitch angle, and calculate the representative roll angle based on the plurality of calculated roll angles.

With this configuration, the specific method for calculating the representative roll angle used for calculating the yaw angle is indicated.

Further, the attitude angle calculating module may calculate, by using two of the plurality of baseline vectors as a pair, a pitch angle for every pair, and calculate the representative pitch angle based on the plurality of calculated pitch angles.

With this configuration, the specific method for calculating the representative pitch angle used for calculating the yaw angle and the roll angle is indicated. Moreover, by combining these specific calculating methods, the attitude angle can be calculated highly accurately based on the carrier wave phase measurement values of the positioning signals.

Further, the three or more antennas may be arranged such that at least one of the plurality of baseline vectors becomes parallel to a heading of the movable body.

With this configuration, the yaw angle can be calculated simply at high speed.

Further, the status calculating apparatus may further include a position calculating module for calculating coordinates of a specific position of the movable body by using the attitude angle and the correlation results of the plurality of positioning signals. In calculating the coordinates of the specific position, the position calculating module may correct the results of the plurality of positioning signals by using the attitude angle.

Further, the status calculating apparatus may further include a speed calculating module for calculating a speed of the specific position of the movable body by using the attitude angle and the correlation results of the plurality of positioning signals. In calculating the speed of the specific position, the speed calculating module may correct the results of the plurality of positioning signals by using the attitude angle.

With these configurations, as using the attitude angle calculated highly accurately as described above, the coordinates and speed of the specific position can be calculated accurately.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A status calculating apparatus according to a first embodiment of the present invention is described with reference to the appended drawings. In this embodiment, a movable body is a ship, and an apparatus for calculating a traveling status of the ship is described; however, the following configuration can also be applied to cases of calculating moving statuses of other movable bodies on/in a water, movable bodies on land (e.g., an automobile), and movable bodies in the air (e.g., aircrafts).

Figure 1:
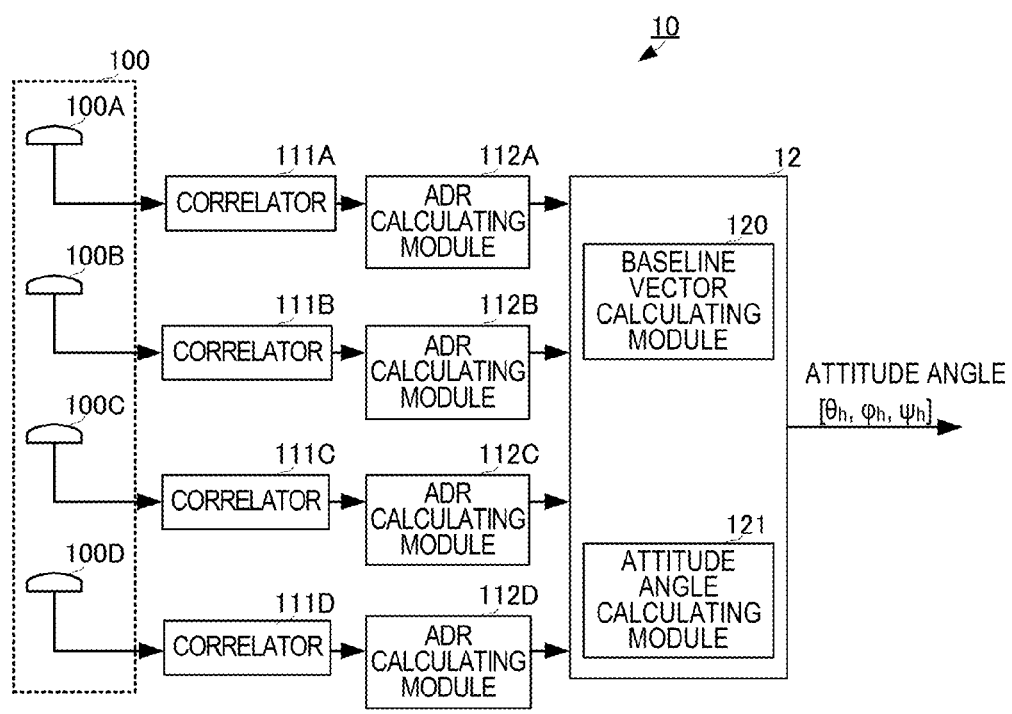
FIG. 1 is a block diagram illustrating a configuration of a status calculating apparatus according to a first embodiment of the present invention.
Figure 2:
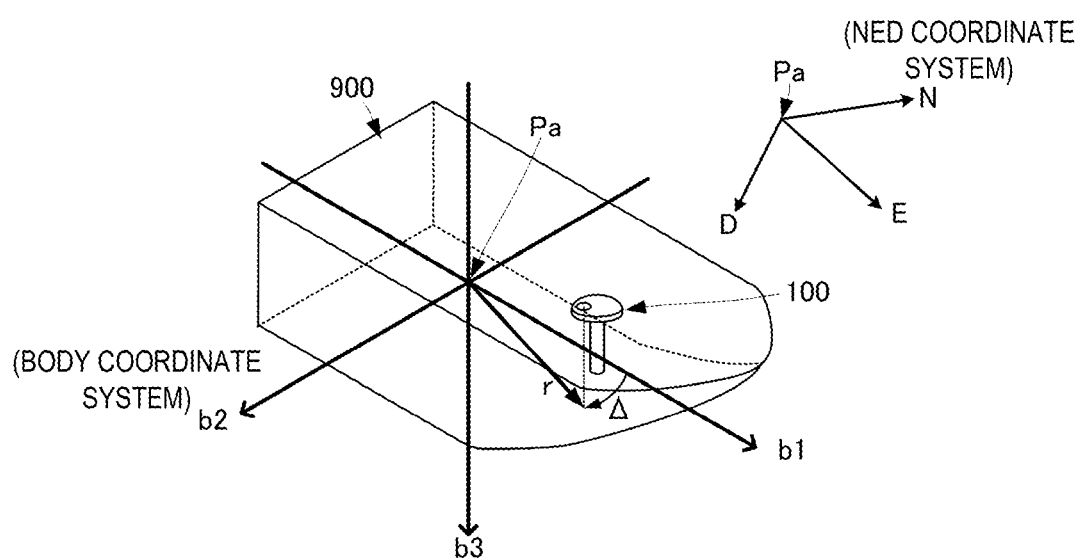
FIG. 2 is a view for describing a principle for calculating a traveling status of a movable body according to the first embodiment of the present invention.
Figure 3:
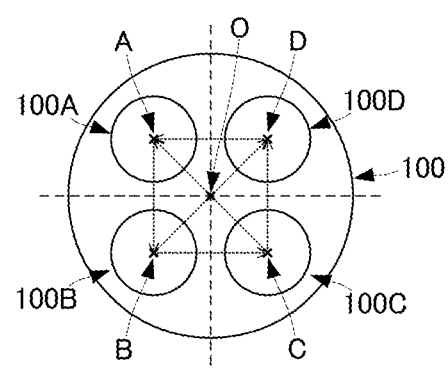
FIG. 3 is a view illustrating relationships of an arrangement of respective antennas of an antenna set with baseline vectors.

FIG. 1 is a block diagram illustrating a configuration of the status calculating apparatus according to the first embodiment of the present invention. FIG. 2 is a view for describing a principle for calculating the traveling status of the movable body of the first embodiment. In FIG. 2, a relationship of how an antenna set 100 is installed in a ship 900, with each of a BODY coordinate system (hull coordinate system) and an NED coordinate system (terrestrial coordinate system) is illustrated. FIG. 3 is a view illustrating relationships of an arrangement of respective antennas of the antenna set with baseline vectors.

As illustrated in FIG. 1, a status calculating apparatus 10 includes the antenna set 100, correlators 111A, 111B, 111C and 111D, ADR calculating modules 112A, 112B, 112C and 112D, and an operator 12.

As illustrated in FIG. 2, the antenna set 100 is installed at a position with good visibility on the ship 900, in other words, where a reception environment for positioning signals from a plurality of positioning satellites is good. For example, as illustrated in FIG. 2, the antenna set 100 is installed at a tip end part of a pole installed in a deck of the ship 900.

The antenna set 100 of this embodiment includes antennas 100A, 100B, 100C and 100D. As illustrated in FIG. 3, the antennas 100A, 100B, 100C and 100D are disposed in the same plane within a housing of the antenna set 100. Here, the antennas 100A, 100B, 100C and 100D are arranged so that a square of which four corners are at a central position A of the antenna 100A, a central position B of the antenna 100B, a central position C of the antenna 100C, and a central position D of the antenna 100D. Note that, hereinafter, a central position of the square formed based on the arrangement positions of the antenna 100A, 100B, 100C and 100D is an arrangement central position O. Moreover, the antenna set 100 is arranged on the ship 900 so that the plane in which the antennas 100A, 100B, 100C and 100D are arranged becomes parallel to a horizontal plane of the ship 900.

Each of the antennas 100A, 100B, 100C and 100D receives the positioning signals from the positioning satellites, and outputs them to a corresponding correlator among the correlators 111A, 111B, 111C and 111D. Here, for example, the positioning satellites are GPS (Global Positioning System) satellites, and each positioning signal is a GPS signal. Note that, without limiting to GPS, the positioning satellites and positioning signals of GNSS (Global Navigation Satellite Systems) may be used.

The correlator 111A outputs a carrier wave phase difference for every positioning signal from the antenna 100A based on a carrier correlation result between the positioning signal and a replica signal. The ADR calculating module 112A integrates the carrier wave phase differences, calculates a carrier wave phase measurement value $ADR_A$, and outputs it to the operator 12. Note that, the correlator 111A calculates a pseudorange $PR_A$ based on a code correlation result between each positioning signal from the antenna 100A and the replica signal, and outputs it to the operator 12.

The correlator 111B outputs a carrier wave phase difference for every positioning signal from the antenna 100B based on a carrier correlation result between the positioning signal and a replica signal. The ADR calculating module 112B integrates the carrier wave phase differences, calculates a carrier wave phase measurement value $ADR_B$, and outputs it to the operator 12. Note that, the correlator 111B calculates a pseudorange $PR_B$ based on a code correlation result between each positioning signal from the antenna 100B and the replica signal, and outputs it to the operator 12.

The correlator 111C outputs a carrier wave phase difference for every positioning signal from the antenna 100C based on a carrier correlation result between the positioning signal and a replica signal. The ADR calculating module 112C integrates the carrier wave phase differences, calculates a carrier wave phase measurement value $ADR_C$, and outputs it to the operator 12. Note that, the correlator 111C calculates a pseudorange $PR_C$ based on a code correlation result between each positioning signal from the antenna 100C and the replica signal, and outputs it to the operator 12.

The correlator 111D outputs a carrier wave phase difference for every positioning signal from the antenna 100D based on a carrier correlation result between the positioning signal and a replica signal. The ADR calculating module 112D integrates the carrier wave phase differences, calculates a carrier wave phase measurement value $ADR_D$, and outputs it to the operator 12. Note that, the correlator 111D calculates a pseudorange $PR_D$ based on a code correlation result between each positioning signal from the antenna 100D and the replica signal, and outputs it to the operator 12.

The operator 12 of this embodiment calculates an attitude angle but not positional coordinates and a speed as described below, and therefore, the correlators 111A, 111B, 111C and 111D and the ADR calculating modules 112A, 112B, 112C and 112D only need to calculate at least the carrier wave phase measurement values $ADR_A$, $ADR_B$, $ADR_C$ and $ADR_D$.

The operator 12 includes a baseline vector calculating module 120 and an attitude angle calculating module 121.

The baseline vector calculating module 120 calculates a plurality of baseline vectors by using the carrier wave phase measurement values $ADR_A$, $ADR_B$, $ADR_C$ and $ADR_D$. Each baseline vector is determined by combining two of the plurality of installed antennas. Specifically, in this embodiment, six baseline vectors including baseline vectors AB, BC, CD, DA, BD and CA are calculated. There are known methods of calculating the baseline vector. One representative calculating method includes calculating a double phase difference for two antennas and two positioning satellites, determining an integer value ambiguity, and determining the baseline vector by using the integer value ambiguity.

The baseline vector AB starts from the central position A of the antenna 100A and ends at the central position B of the antenna 100B. The baseline vector BC starts from the central position B of the antenna 100B and ends at the central position C of the antenna 100C. The baseline vector CD starts from the central position C of the antenna 100C and ends at the central position D of the antenna 100D. The baseline vector DA starts from the central position D of the antenna 100D and ends at the central position A of the antenna 100A. The baseline vector BD starts from the central position B of the antenna 100B and ends at the central position D of the antenna 100D. The baseline vector CA starts from the central position C of the antenna 100C and ends at the central position A of the antenna 100A.

The attitude angle calculating module 121 selects a plurality of baseline vectors from the above baseline vectors and calculates the attitude angle based on the plurality of selected baseline vectors. The calculation method of the attitude angle performed by the operator 12 is described later in detail. The attitude angle is composed of the pitch angle $\theta$ ($\theta_h$), the roll angle $\phi$ ($\phi h$), and the yaw angle $\psi$ ($\psi_h$). The pitch angle $\theta$ ($\theta_h$), the roll angle $\phi$ ($\phi_h$), and the yaw angle $\psi$ ($\psi_h$) are indicated in the BODY coordinate system. As illustrated in FIG. 2, the BODY coordinate system is formed by a b1 axis that is parallel to a heading of the ship 900, a b2 axis that is parallel to a steering direction of the ship 900, and a b3 axis that is perpendicular to the b1 and b2 axes. In other words, the b3 axis is parallel to the vertical direction in the state where the ship 900 is not rocking. The center Pa of the BODY coordinate system is set to the center of gravity position of the ship 900.

The pitch angle $\theta$ ($\theta_h$) is an angle in a plane defined by the b1 and b3 axes and indicates an amount of movement of bow and stern of the ship in the vertical direction. The roll angle $\phi$ ($\phi_h$) is an angle in a plane defined by the b2 and b3 axes and indicates an amount of movement of port and starboard sides of the ship in the vertical direction. The yaw angle $\psi$ ($\psi_h$) is an angle in a plane defined by the b1 and b2 axes and indicates an amount of movement of the heading of the ship in a horizontal plane.

To put it simply, the attitude angle calculating module 121 calculates a plurality of pitch angles $\theta$, a plurality of roll angles $\phi$, and a plurality of yaw angles $\psi$, and outputs a representative pitch angle $\theta_h$, a representative roll angle $\phi_h$, and a representative yaw angle $\psi_h$, as the attitude angle [$\theta_h$, $\phi_h$, $\psi_h$].

Note that, the series of processing described above may be performed at each functional block, or may be programmed and performed by an information processing device, such as a computer.

Figure 4:
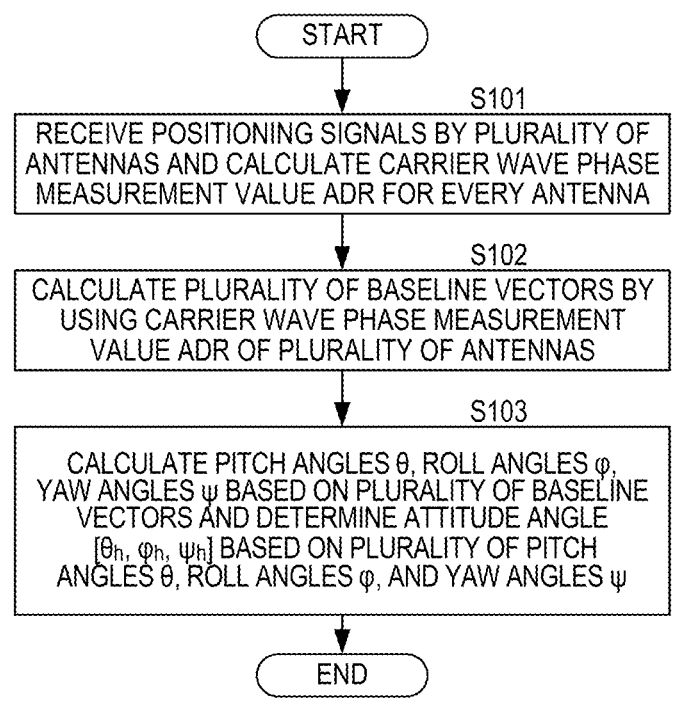
FIG. 4 is a schematic flowchart of an attitude angle calculation performed by the status calculating apparatus of the first embodiment.

FIG. 4 is a schematic flowchart of the attitude angle calculation performed by the status calculating apparatus of this embodiment.

As described above, the positioning signals are received by each of the antennas 100A, 100B, 100C and 100D, and the carrier wave phase measurement values $ADR_A$, $ADR_B$, $ADR_C$ and $ADR_D$ are calculated for the antennas 100A, 100B, 100C and 100D, respectively (S101). The operator 12 calculates the plurality of baseline vectors AB, BC, CD, DA, BD and CA by using the carrier wave phase measurement values $ADR_A$, $ADR_B$, $ADR_C$ and $ADR_D$ (S102).

The operator 12 calculates the plurality of pitch angles $\theta$, the plurality of roll angles $\phi$, and the plurality of yaw angles $\psi$ by using the plurality of baseline vectors. The operator 12 determines the representative values of the plurality of pitch angles $\theta$, the plurality of roll angles $\phi$, and the plurality of yaw angles $\psi$, respectively, and outputs them as the attitude angle [$\theta_h$, $\phi_h$, $\psi_h$] (S103).

Next, the specific calculation method of the attitude angle [$\theta_h$, $\phi_h$, $\psi_h$] is described.

(Principles)

The rotations from the BODY coordinate system to the NED coordinate system are set as roll, pitch and yaw in the order of the rotation, and the respective angles are set as [$\theta$, $\phi$, $\psi$], i.e., the roll angle $\theta$, the pitch angle $\phi$, and the yaw angle $\psi$.

Here, the antenna arrangement is parallel to the ship 900 as described above, in other words, on a plane orthogonal to the b3 axis in FIG. 2. Here, by using a distance r in the BODY coordinate system and an angle $\Delta$ with respect to the heading, a generalized vector $x^b$ of the antenna arrangement can be indicated by the following equation.

$$x^b = \begin{pmatrix} r \cdot \cos\Delta \\ r \cdot \sin\Delta \\ 0 \end{pmatrix} \quad (1)$$

Moreover, a baseline vector $x^n$ in the NED coordinate system can be indicated by the following equation.

$$x^n = \begin{pmatrix} x_N \\ x_E \\ x_D \end{pmatrix} \quad (2)$$

The conversion equation from the BODY coordinate system into the NED coordinate system can be indicated by the following equation by having a rotation matrix as $C_b^n$.

$$x^n = C_b^n x^b \quad (3)$$

When Equation 3 is indicated by respective components and the right side is calculated, it becomes the following equation.

$$\begin{pmatrix} x_N \\ x_E \\ x_D \end{pmatrix} = \begin{pmatrix} r\cos\Delta\cos\psi\cos\theta + r\sin\Delta(\cos\psi\sin\theta\sin\phi - \sin\psi\cos\phi) \\ r\cos\Delta\sin\psi\cos\theta + r\sin\Delta(\sin\psi\sin\theta\sin\phi - \cos\psi\cos\phi) \\ -r\cos\Delta\sin\theta + r\sin\Delta\cos\theta\sin\phi \end{pmatrix} \quad (4)$$

When the arrangement of two of the antennas is indicated by the BODY coordinate system, it becomes the following equation based on Equation 1.

$$x^b = \begin{pmatrix} r_1\cos\Delta_1 & r_2\cos\Delta_2 \\ r_1\sin\Delta_1 & r_2\sin\Delta_2 \\ 0 & 0 \end{pmatrix} \quad (5)$$

Moreover, when two of the baseline vectors are indicated by the NED coordinate system, it becomes the following equation based on Equation 2.

$$x^n = \begin{pmatrix} x_{N1} & x_{N2} \\ x_{E1} & x_{E2} \\ x_{D1} & x_{D2} \end{pmatrix} \quad (6)$$

When a $\sin\phi$ of the roll angle $\phi$ is solved by using the parts of Equations 4, 5 and 6 regarding $x_D$, the following equation can be obtained.

$$\sin\phi = \frac{\frac{x_{D1}}{r_1} + \cos\Delta_1\sin\theta}{\sin\Delta_1\cos\theta} = \frac{\frac{x_{D2}}{r_2} + \cos\Delta_2\sin\theta}{\sin\Delta_2\cos\theta} \quad (7)$$

Further, when Equation 7 is solved by the pitch angle $\theta$, the following equation can be obtained.

$$\theta = \sin^{-1}\left( \frac{\frac{x_{D2}}{r_2}\sin\Delta_1 - \frac{x_{D1}}{r_1}\sin\Delta_2}{\sin(\Delta_2 - \Delta_1)} \right) \quad (8)$$

As it can be understood from Equation 8, by finding two baseline vectors and the angles of the two baseline vectors with respect to the heading of the ship, the pitch angle $\theta$ can be calculated.

Then, as it can be understood from Equation 7, by finding the pitch angle $\theta$ and one baseline vector, the roll angle $\phi$ can be calculated.

Further, by using the parts of Equation 4 regarding $x_N$ and $x_E$, the following equation can be obtained.

$$\psi = \tan^{-1}\left( \frac{-\sin\Delta\cos\phi \cdot x_N + (\cos\Delta\cos\theta + \sin\Delta\sin\theta\sin\phi)x_E}{(\cos\Delta\cos\theta + \sin\Delta\sin\theta\sin\phi)x_N + \sin\Delta\cos\phi \cdot x_E} \right) \quad (9)$$

As it can be understood from Equation 9, by finding the pitch angle $\theta$, the roll angle $\phi$, and a single baseline vector, the yaw angle $\psi$ can be calculated.

By using the above principles, the operator 12 of this embodiment calculates the attitude angle $[\theta_h, \phi_h, \psi_h]$ specifically along the following flow.

Figure 5:
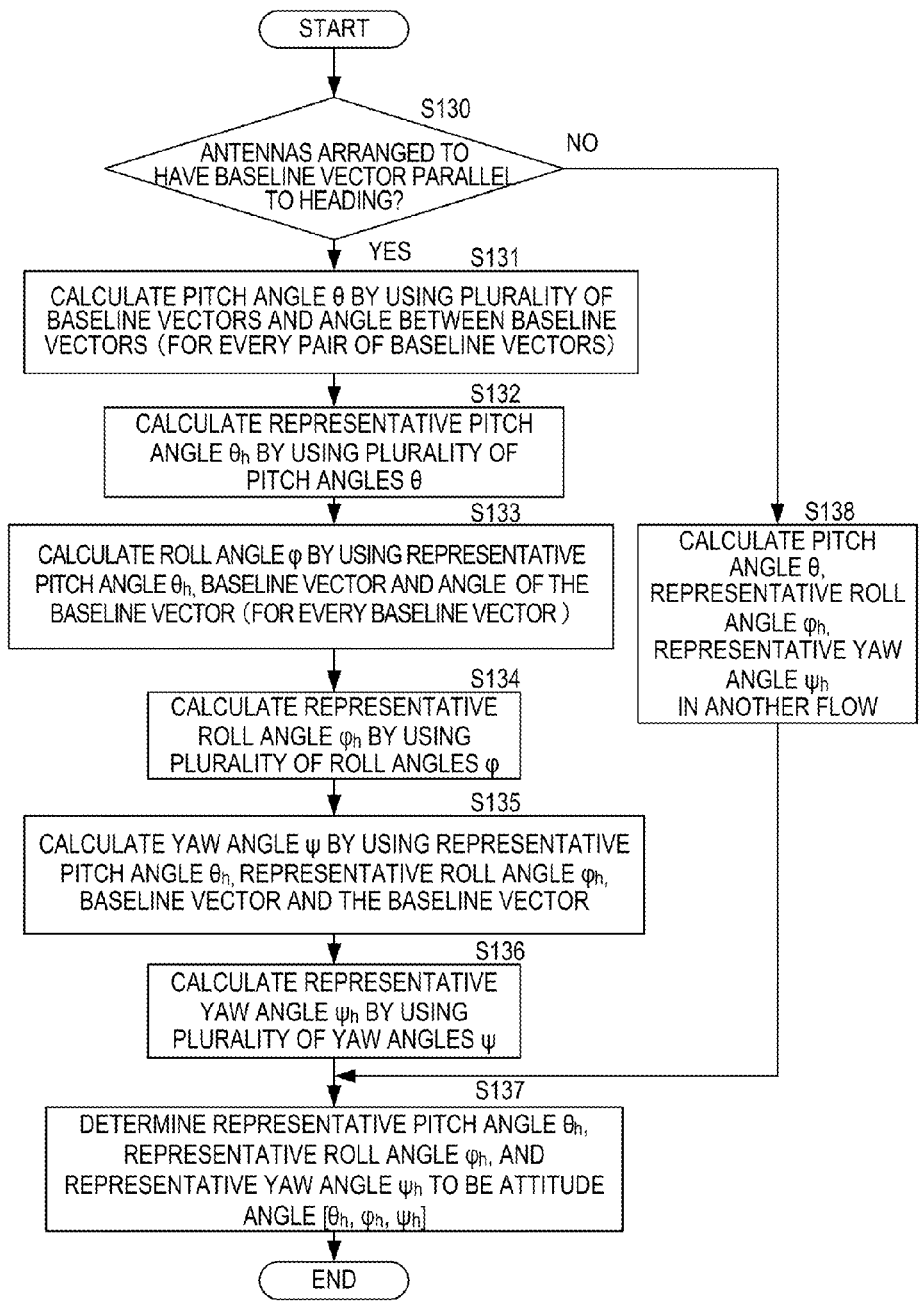
FIG. 5 is a specific flowchart of the attitude angle calculation performed by an operator.

FIG. 5 is a specific flowchart of the attitude angle calculation performed by the operator.

First, the operator 12 determines whether the antennas are arranged having a baseline vector in parallel to the heading (S130). If the result is positive, the flow proceeds to S131, but if it is negative, the flow proceeds to S138, where the pitch angle $\theta$, the representative roll angle $\phi_h$, and the representative yaw angle $\psi_h$ are calculated in a different flow. In this embodiment, the result of S130 is positive. Then, the operator 12 calculates the pitch angle $\theta$ by using the two baseline vectors, with the operation method indicated by Equation 8 described above. More specifically, by substituting, into Equation 8, the calculated two baseline vectors and the angles of the two baseline vectors with respect to the heading, the pitch angle $\theta$ is calculated. Here, the operator 12 changes the combination of the two baseline vectors to be selected, and calculates the pitch angle $\theta$ for every pair of the baseline vectors (S131).

The operator 12 calculates the representative pitch angle $\theta_h$ of the plurality of pitch angles $\theta$ (S132). Specifically, for example, the operator 12 calculates an average value of the plurality of pitch angles $\theta$ and sets it as the representative pitch angle $\theta_h$.

The operator 12 calculates the roll angle $\phi$ by using the representative pitch angle $\theta_h$ and the single baseline vector, with the operation method indicated by Equation 7 described above. More specifically, by substituting, into Equation 7, the representative pitch angle $\theta_h$ calculated in the above processing, the calculated single baseline vector, and the angle of the single baseline vector, the roll angle $\phi$ is calculated. Here, the operator 12 changes the baseline vector to be combined with the representative pitch angle $\theta_h$, and calculates the roll angle $\phi$ for every combination (S133).

The operator 12 calculates the representative roll angle $\phi_h$ of the plurality of roll angle $\phi$ (S134). Specifically, for example, the operator 12 calculates an average value of the plurality of roll angles $\phi$ and sets it as the representative roll angle $\phi_h$.

The operator 12 calculates the yaw angle $\psi$ by using the representative pitch angle $\theta_h$, the representative roll angle $\phi_h$, and the single baseline vector, with the operation method indicated by Equation 9 described above. More specifically, by substituting, into Equation 9, the representative pitch angle $\theta_h$ and the representative roll angle $\phi_h$ calculated in the above processing, the calculated single baseline vector, and the angle of the single baseline vector, the yaw angle $\psi$ is calculated. Here, the operator 12 changes the baseline vector to be combined with the representative pitch angle $\theta_h$ and the representative roll angle $\phi_h$, and calculates the yaw angle $\psi$ for every combination (S135).

The operator 12 calculates the representative yaw angle $\psi_h$ of the plurality of yaw angles $\psi$ (S136). Specifically, for example, the operator 12 calculates an average value of the plurality of yaw angles $\psi$ and sets it as the representative yaw angle $\psi_h$.

The operator 12 determines the representative pitch angle $\theta_h$, the representative roll angle $\phi_h$, and the representative yaw angle $\psi_h$ to be the attitude angle $[\theta_h, \phi_h, \psi_h]$ (S137).

By using such a method, for each kind of components of the attitude angle (the pitch angle, the roll angle, and the yaw angle), a plurality of components can be calculated, and the number of the plurality of components corresponds to the number of the calculated baseline vectors. Then, by using the representative value (e.g., the average value) of the plurality of attitude angle components of each kind, an observation error in each kind of attitude angle components is reduced. Therefore, the attitude angle can be calculated highly accurately.

Moreover, in a case where similar level of accuracy is required, an antenna interval can be narrowed compared to the conventional configuration. Thus, the antenna arrangement area can be smaller, and moreover, the antenna set can be downsized.

Moreover, the average value described above as the representative value may be a weighted average value or a non-weighted average value. In a case of performing weighting, the weight amount can be determined based on the relationship between the direction of each baseline vector used for calculating the attitude angle and the direction of each attitude angle component, for example. Furthermore, the weighting may be performed based on the positioning accuracy at each antenna position. For example, the weight amount may be set to be larger for the baseline vector using the antenna with higher positioning accuracy. Further, in the above description, the example in which the average value is calculated as the representative value is described; however, other kinds of statistic values, for example, a medium value, may be used.

Moreover, by arranging the plurality of antennas as illustrated in FIG. 3, the attitude angle can be calculated highly accurately as a whole. Specifically, as illustrated in FIG. 3, with configuration of this embodiment, the plurality of antennas 100A, 100B, 100C and 100D are arranged in a plane orthogonal to the b3 axis of the BODY coordinate system such that they are at the same distance from the arrangement central position O as each other. Moreover, the antennas 100A, 100B, 100C and 100D are at rotational symmetric positions, forming 90° therebetween centering on the arrangement central position O. Thus, the antennas 100A, 100B, 100C and 100D are arranged in a pattern in which they are samely arranged in both of the b1 and b2 axes. In other words, the antennas 100A, 100B, 100C and 100D are arranged isotropically.

Due to such an arrangement pattern, when the ship 900 inclines, the baseline vectors change substantially the same with respect to the pitch and roll angles $\theta$ and $\phi$. Therefore, the pitch and roll angles $\theta$ and $\phi$ can be calculated at substantially the same accuracy. Thus, the pitch and roll angles $\theta$ and $\phi$ can be calculated while maintaining the isotropy, and the yaw angle which is calculated using the pitch and roll angles can be calculated at similar accuracy regardless of the direction to which the ship rocks. As a result, the attitude angle can be calculated highly accurately as a whole without any deviation in the directions.

Moreover, by using such an antenna arrangement, regardless of the angle of each antenna of the antenna set with the heading, the pitch and roll angles $\theta$ and $\phi$ can be calculated while maintaining the isotropy. Thus, the installation of the antenna set in the ship becomes easy since the installation direction of the antenna set in the ship does not have much influence.

Note that here, the antennas are arranged isotropically; however, they may be arranged substantially isotropically. In other words, the plurality of antennas may be slightly offset. Also in this case, the attitude angle can be calculated at substantially similar accuracy to the case with the isotropy.

Moreover, the antenna set 100 may be arranged in the ship 900 so that the baseline vector coupling the central position A of the antenna 100A to the central position B of the antenna 100B and the baseline vector coupling the central position C of the antenna 100C to the central position D of the antenna 100D become parallel to the heading of the ship 900 (the b1 axial direction of the BODY coordinate system). By having such an arrangement, the attitude angle calculation becomes easy as described later.

Moreover, by using such an arrangement, the baseline vector parallel to the heading becomes short. Therefore, the baseline vector parallel to the heading can be calculated swiftly and highly accurately. Thus, the attitude angle can be calculated more swiftly depending on the situation.

Next, the pitch angle $\theta$ which is parallel to the heading with the above antenna arrangement, the roll angle $\phi$, and the yaw angle $\psi$, may be calculated by the following respective methods according to the arrangement of the plurality of antennas, in other words, the setting method of the baseline vectors.

(Calculation Method of Pitch Angle $\theta$)

Figure 6:
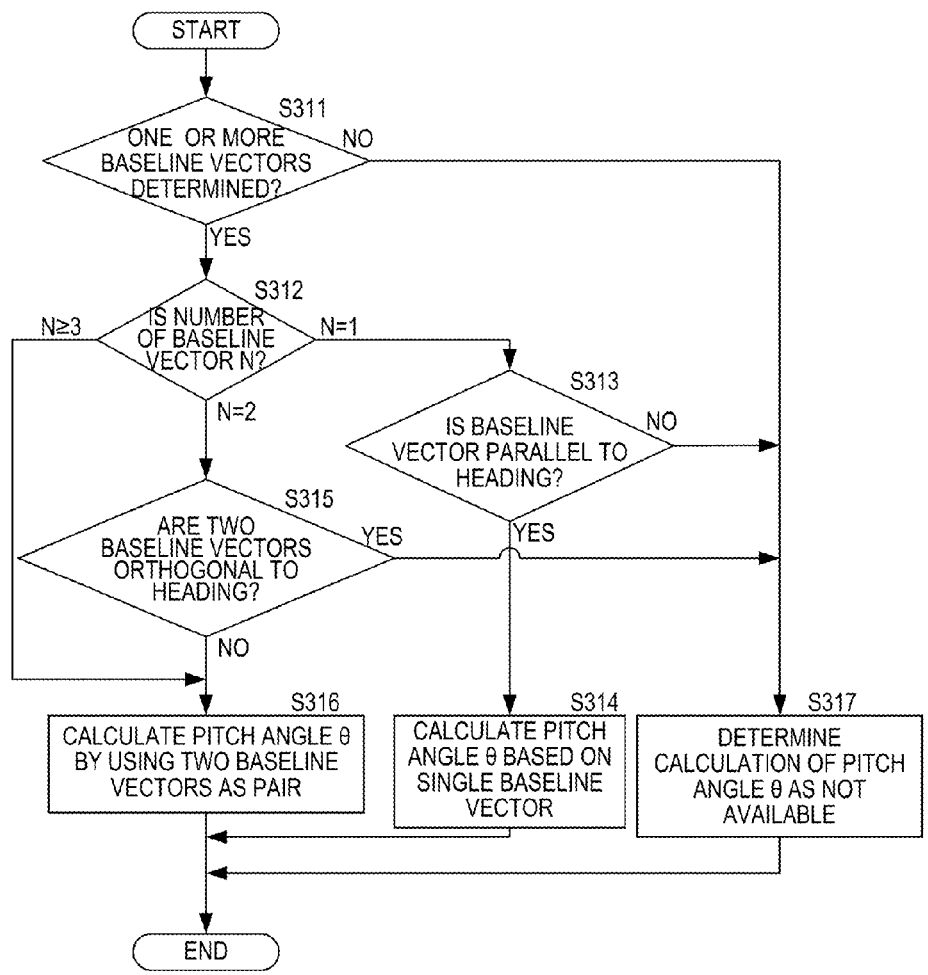
FIG. 6 is a flowchart of a calculation of a pitch angle $\theta$.

FIG. 6 is a flowchart of the calculation of the pitch angle $\theta$.

First, whether one or more baseline vectors are determined is detected. If the baseline vector is not determined at all (S311: NO), the calculation of the pitch angle $\theta$ is determined as not available (S317).

If one or more baseline vectors are determined (S311: YES), the number N of the determined baseline vectors is acquired.

If the number of the determined baseline vectors is one (S312: N=b1), whether the baseline vector is parallel to the heading, in other words, the b1 axial direction is detected. If the baseline vector is not parallel to the heading (S313: NO), the calculation of the pitch angle $\theta$ is determined as not available (S317). On the other hand, if the baseline vector is parallel to the heading (S313: YES), in other words, in the case with the antenna arrangement in FIG. 3, if the determined baseline vector is one of the baseline vectors AB and CD, the pitch angle $\theta$ is calculated using the baseline vector (S314). In this case, the pitch angle $\theta$ can be calculated based on Equation 8 described above, by having $\Delta_1$ as 0° or $\Delta_2$ as 180°.

If the number of the determined baseline vectors is two (S312: N=2), whether the two baseline vectors are orthogonal to the heading is detected. If the two baseline vectors are orthogonal to the heading (S315: YES), in other words, in the case with the antenna arrangement in FIG. 3, if the determined baseline vectors are the baseline vectors BC and DA, the calculation of the pitch angle $\theta$ is determined as not available (S317). On the other hand, if the two baseline vectors are not orthogonal to the heading (S315: NO), the pitch angle $\theta$ is calculated based on Equation 8 described above, by using the two baseline vectors as a pair (S316).

If the number of the determined baseline vectors is three or more (S312: N≥3), the pitch angle $\theta$ is calculated based on Equation 8 described above, by selecting two of the plurality of determined baseline vectors and using the two baseline vectors (S316).

(Calculation Method of Roll Angle $\phi$)

Figure 7:
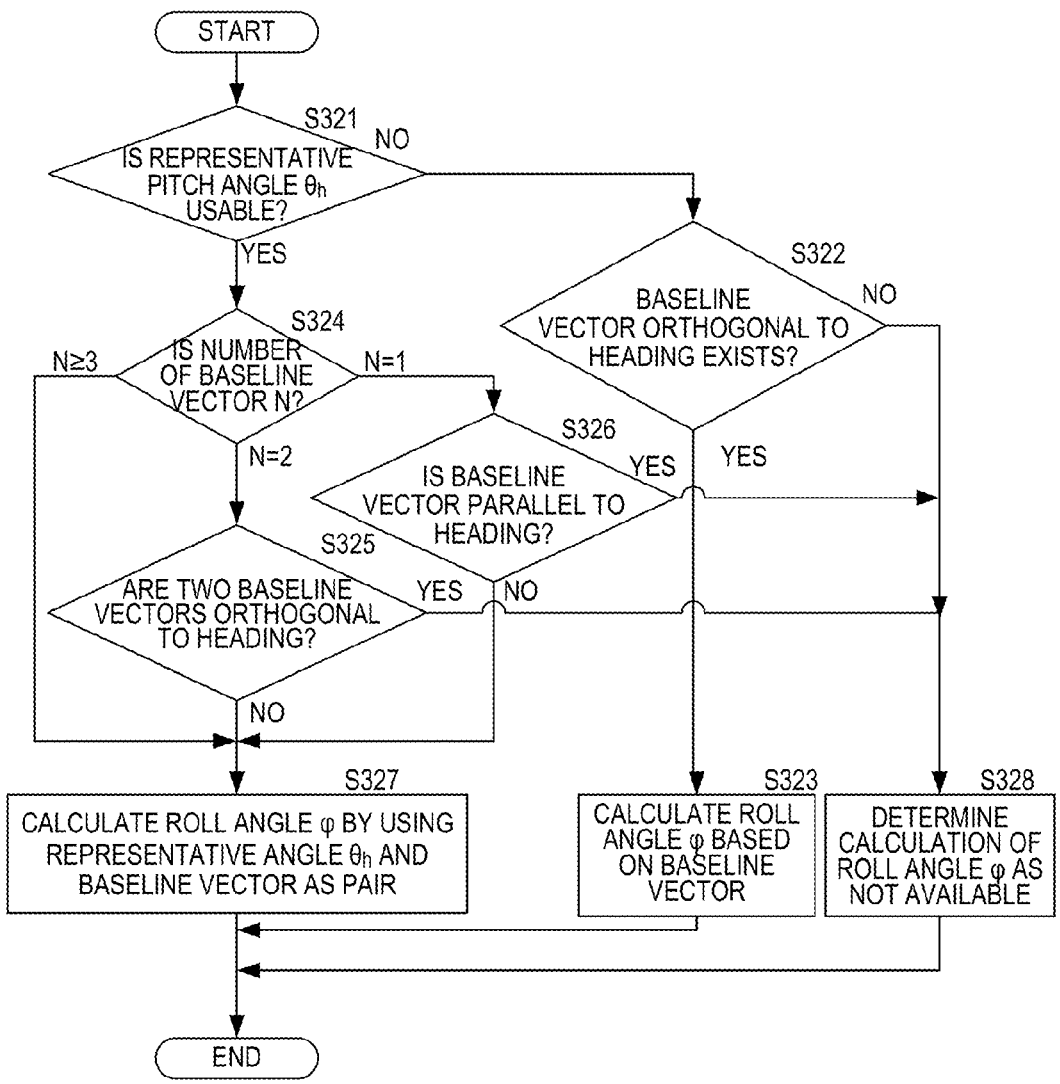
FIG. 7 is a flowchart of a calculation of a roll angle $\phi$.

FIG. 7 is a flowchart of the calculation of the roll angle $\phi$.

First, whether the representative pitch angle $\theta_h$ is usable is determined, and if it is not usable (S321: NO), whether the baseline vector orthogonal to the heading exists is detected. If the baseline vector orthogonal to the heading does not exist (S322: NO), the calculation of the roll angle $\phi$ is determined as not available (S328). If the baseline vector orthogonal to the heading exists (S322: YES), the roll angle $\phi$ is calculated using the baseline vector (S323). Note that, with the calculation method of the roll angle $\phi$ in this case, since the movement of the baseline vector in the b3 axis corresponds to the roll angle φ, the roll angle φ can be calculated by using this.

If the representative pitch angle $θ_h$ is usable (S321: YES), the number N of the baseline vectors is acquired.

If the number of the determined baseline vectors is one (S324: N=b1), whether the baseline vector is parallel to the heading, in other words, the b1 axial direction is detected. If the baseline vector is parallel to the heading (S326: YES), in other words, in the case with the antenna arrangement in FIG. 3, if the determined baseline vector is one of the baseline vectors AB and CD, the calculation of the roll angle φ is determined as not available (S328). If the baseline vector is not parallel to the heading (S326: NO), the roll angle φ is calculated based on Equation 7 described above, by using the baseline vector and the representative pitch angle $θ_h$ as a pair (S327).

If the number of the determined baseline vectors is two (S324: N=2), whether the two baseline vectors are orthogonal to the heading is detected. If the two baseline vectors are orthogonal to the heading (S325: YES), in other words, in the case with the antenna arrangement in FIG. 3, if the determined baseline vectors are the baseline vectors BC and DA, the calculation of the roll angle φ is determined as not available (S328). On the other hand, if the two baseline vectors are not orthogonal to the heading (S325: NO), the roll angle φ is calculated based on Equation 7 described above, by selecting one of the two baseline vectors and using the selected baseline vector and the representative pitch angle $θ_h$ as a pair (S327).

If the number of the determined baseline vectors is three or more (S324: N≥3), the roll angle φ is calculated based on Equation 7 described above, by selecting one of the plurality of determined baseline vectors and using the selected baseline vector and the representative pitch angle $θ_h$ as a pair (S327).

(Calculation Method of Yaw Angle ψ)

Figure 8:
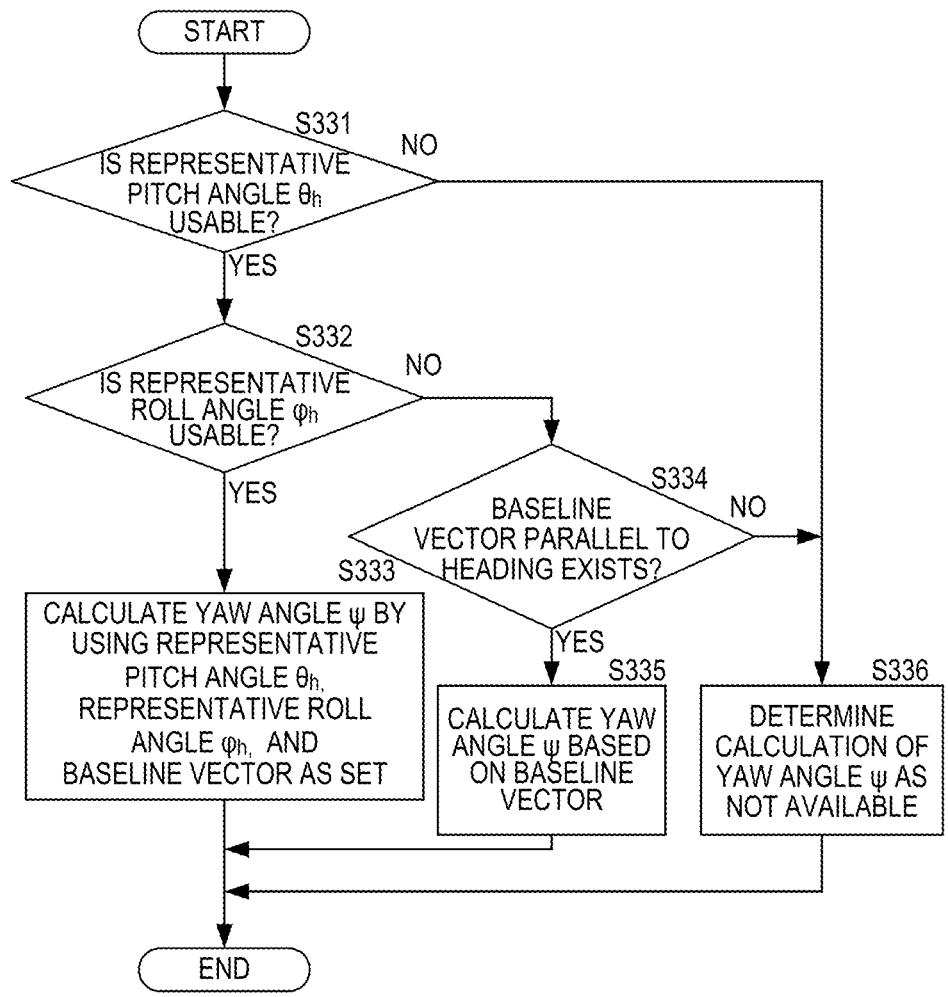
FIG. 8 is a flowchart of a calculation of a yaw angle $\psi$.

FIG. 8 is a flowchart of the calculation of the yaw angle ψ.

First, whether the representative pitch angle $θ_h$ is usable is determined, and if it is not usable (S331: NO), the calculation of the yaw angle ψ is determined as not available (S336).

If the representative pitch angle $θ_h$ is usable (S321: YES), whether the representative roll angle $φ_h$ is usable is determined. If the representative roll angle $φ_h$ is not usable (S332: NO), whether the baseline vector parallel to the heading exists is detected. If the baseline vector parallel to the heading does not exist (S334: NO), the calculation of the yaw angle ψ is determined as not available (S336). If the baseline vector parallel to the heading exists (S334: YES), the yaw angle ψ is calculated by using the baseline vector and the representative pitch angle $θ_h$ (S335). Note that, with the calculation method of the yaw angle ψ in this case, since the movement of the baseline vector in the b2 axis corresponds to the yaw angle ψ, the yaw angle ψ can be calculated by using this.

If the representative roll angle $φ_h$ is usable (S332: YES), the yaw angle ψ is calculated based on Equation 9 described above, by using the representative pitch and roll angles $θ_h$ and $φ_h$ and the baseline vector as a set (S333).

By adopting such configuration and processing, the attitude angle can be calculated with less number of baseline vectors depending on the antenna arrangement.

Figure 9:
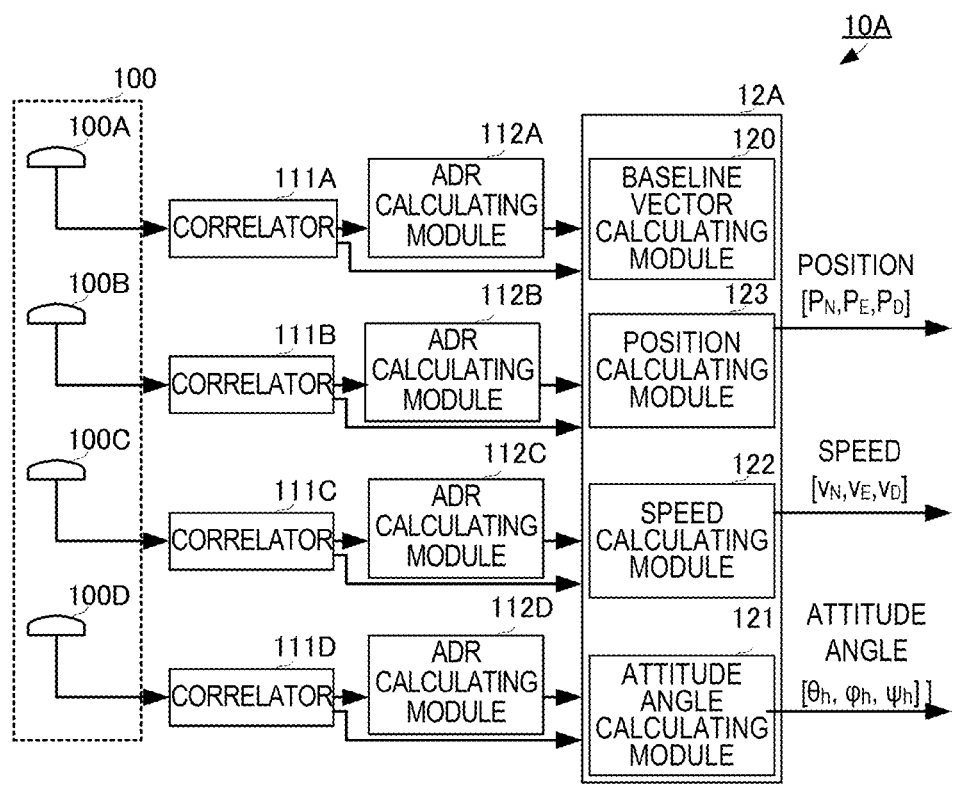
FIG. 9 is a block diagram illustrating a configuration of a status calculating apparatus according to a second embodiment of the present invention.

Next, a status calculating apparatus according to a second embodiment of the present invention is described with reference to the appended drawings. FIG. 9 is a block diagram illustrating a configuration of the status calculating apparatus of the second embodiment of the present invention. A status calculating apparatus 10A of this embodiment, schematically, is different from the status calculating apparatus 10 of the first embodiment in that position (positional coordinates) and speed of the ship are also calculated in addition to the attitude angle.

An operator 12A includes a baseline vector calculating module 120, an attitude angle calculating module 121, a speed calculating module 122, and a position calculating module 123. The baseline vector calculating module 120 has the same configuration as that in the operator 12 of the first embodiment, and performs the same processing. The attitude angle calculating module 121 has the same configuration as that in the operator 12 of the first embodiment, and performs the same processing.

The speed calculating module 122 calculates a speed component at the position of the antenna 100A based on the carrier wave phase measurement value $ADR_A$. The speed calculating module 122 calculates a speed component at the position of the antenna 100B based on the carrier wave phase measurement value $ADR_B$. The speed calculating module 122 calculates a speed component at the position of the antenna 100C based on the carrier wave phase measurement value $ADR_C$. The speed calculating module 122 calculates a speed component at the position of the antenna 100D based on the carrier wave phase measurement value $ADR_D$.

The speed calculating module 122 calculates the speed of the ship 900 based on the speed components at the antennas 100A, 100B, 100C and 100D. The speed calculating module 122 can calculate the speed of the ship at a specific position thereof (e.g., a bow position of the ship 900) without limiting to the positions of the antennas 100A, 100B, 100C and 100D.

Figure 10:
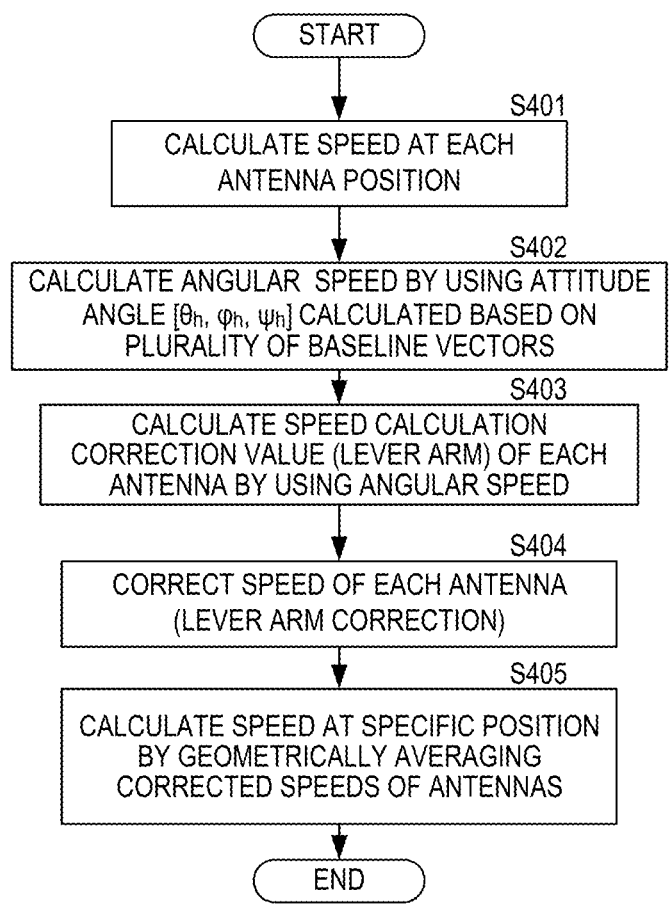
FIG. 10 is a flowchart of a speed calculation according to the second embodiment of the present invention.

Next, the speed calculating module 122 calculates the speed along a flow. FIG. 10 is a flowchart of the speed calculation of the second embodiment of the present invention.

First, the speed calculating module 122 calculates the speed component at each antenna position where the carrier wave phase measurement value is calculated (S401). Here, the speed calculating module 122 calculates the speed component based on respective time change amount of the carrier wave phase measurement value.

The speed calculating module 122 calculates an angular speed at each antenna position based on the time change amount of the attitude angle [$θ_h$, $φ_h$, $ψ_h$] (S402).

The speed calculating module 122 calculates a speed calculation correction value at each antenna position (lever arm correction value) by using the calculated angular speed (S403). The speed calculation correction value (lever arm correction value) is a correction value for suppressing influence of an angular speed on a speed caused by a lever arm effect. The lever arm effect indicates a case where, when the angular speed is added to the ship 900, the angular speed influences the speed to be observed at a position other than a center of gravity Pa of the ship.

The speed calculating module 122 corrects the speed at each antenna position by using the speed calculation correction value (S404).

The speed calculating module 122 calculates the speed at the specific position by using the corrected speeds at the respective antenna positions. Here, the speed calculating module 122 calculates a geometric average value based on distances of the respective antenna positions from the specific position and calculates the speed at the specific position (e.g., the position where the center of gravity Pa is, the bow position of the ship 900) using the geometric average value (S405).

Since each angular speed is calculated by using the attitude angle described above, the speed calculation correction value can be calculated highly accurately. Thus, the lever arm effect can be suppressed highly accurately and the speed can be calculated highly accurately.

Figure 11:
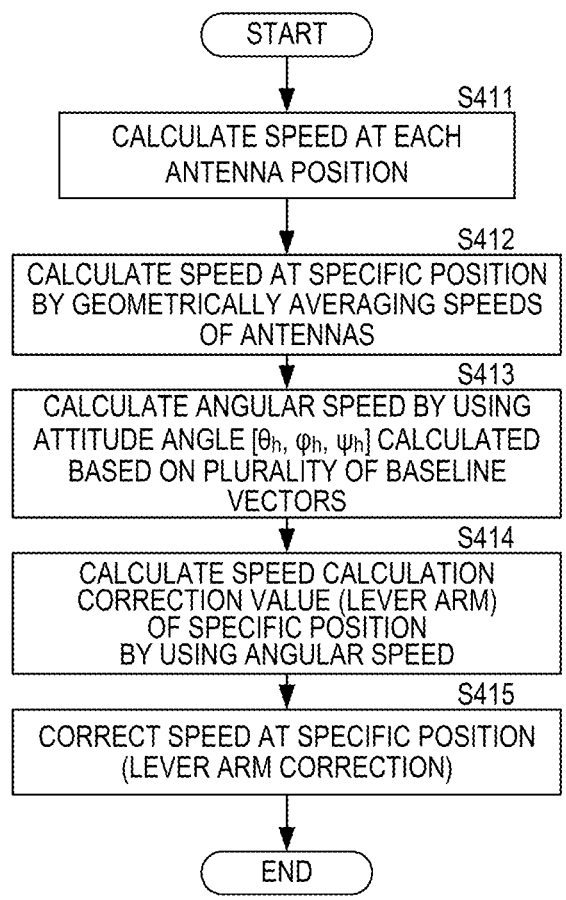
FIG. 11 is another flowchart of the speed calculation according to the second embodiment of the present invention.

The speed calculating module 122 may calculate the speed by the following method. FIG. 11 is another flowchart of the speed calculation of the second embodiment of the present invention.

The speed calculating module 122 calculates the speed component at each antenna position where the carrier wave phase measurement value is calculated (S411). Here, the speed calculating module 122 calculates the speed component based on respective time change amount of the carrier wave phase measurement value.

The speed calculating module 122 calculates the speed at the specific position by using the speed components at the respective antenna positions. Here, the speed calculating module 122 calculates a geometric average value based on distances of the respective antenna positions from the specific position and calculates the speed at the specific position by using the geometric average value (S412).

The speed calculating module 122 calculates an angular speed at each antenna position based on the time change amounts of the attitude angle $[\theta_h, \phi_h, \psi_h]$ (S413). The speed calculating module 122 calculates a speed calculation correction value (lever arm correction value) for the specific position by using the calculated angular speed (S414). Note that, the processing at S413 and S414 may be performed in parallel with or previous to the speed calculation at S411 and S412 described above.

The speed calculating module 122 corrects the speed at the specific position by using the speed calculation correction value for the specific position (S415).

Also with such a method, since each angular speed is calculated by using the attitude angle described above, the speed calculation correction value can be calculated highly accurately. Thus, the lever arm effect can be suppressed highly accurately and the speed can be calculated highly accurately.

Note that, in the above description, the case where the antenna(s) calculating the carrier wave phase measurement value do not change is described; however, depending on the reception state of the positioning signal, an antenna which cannot calculate the carrier wave phase measurement value may exist.

Figure 12A:
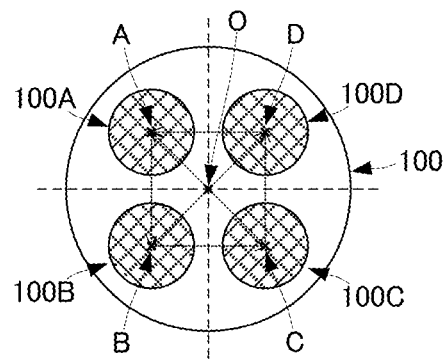
FIG. 12A is a view illustrating a position for which a geometric average value is calculated.
Figure 12B:
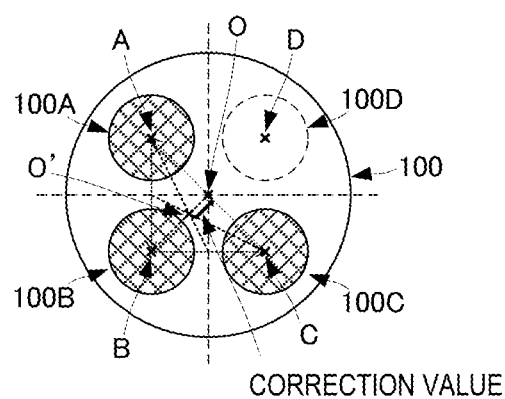
FIG. 12B is a view illustrating a situation where the position for which the geometric average value is calculated deviates from a specific position, and a concept of correcting the deviation.

In this case, the position for which the geometric average value is calculated may be different from the specific position. FIG. 12A is a view illustrating the position for which the geometric average value is calculated, and FIG. 12B is a view illustrating a situation where the position for which the geometric average value is calculated deviates from the specific position, and a concept of correcting the deviation. FIG. 12 illustrates a case where the specific position is the arrangement central position O of the plurality of antennas 100A, 100B, 100C and 100D.

As illustrated in FIG. 12A, in the situation where the carrier wave phase measurement values are successfully calculated at all the positions of the antennas 100A, 100B, 100C and 100D, the geometric average value of the speeds at all the positions of the antennas 100A, 100B, 100C and 100D is the speed at the arrangement central position O (specific position).

As illustrated in FIG. 12B, in the state where the carrier wave phase measurement value cannot be calculated at the position of the antenna 100D, the carrier wave phase measurement value at the position of the antenna 100D cannot be used for calculating the speed at the specific position. Therefore, the geometric average value becomes a value at a geometric average position O' of the antennas 100A, 100B and 100C, which is different from that at the arrangement central position O.

In this case, since positional relationship among the antennas 100A, 100B, 100C and 100D are already known, position errors of geometric average positions of combinations of at least two antennas with respect to the geometric average position (arrangement central position O) of all the antennas 100A, 100B, 100C and 100D are stored in advance. Then, correction values for correcting the position errors are set in advance. Here, the correction values are set by taking the change amount of the speed calculation correction value (lever arm correction value) into consideration.

In the case of calculating the speed at the arrangement central position O, which is the specific position, the antennas where the carrier wave phase measurement value is successfully calculated are detected, the geometric average value of the speeds may be corrected according to the combination of the antennas.

Note that, here, the example in which the arrangement central position O of the all the antennas 100A, 100B, 100C and 100D is set to be the specific position as a reference position; however, even if it was a different position, by performing the correction with a similar concept to the above concept, the speed of the specific position can be corrected accurately.

The position calculating module 123 calculates positional coordinates of the antenna 100A based on either one of the pseudorange $PR_A$ and the carrier wave phase measurement value $ADR_A$. The position calculating module 123 calculates positional coordinates of the antenna 100B based on either one of the pseudorange $PR_B$ and the carrier wave phase measurement value $ADR_B$. The position calculating module 123 calculates positional coordinates of the antenna 100C based on either one of the pseudorange $PR_C$ and the carrier wave phase measurement value $ADR_C$. The position calculating module 123 calculates positional coordinates of the antenna 100D based on either one of the pseudorange $PR_D$ and the carrier wave phase measurement value $ADR_D$.

The position calculating module 123 calculates the positional coordinates of the specific position based on the positional coordinates of the antennas 100A, 100B, 100C and 100D. The specific position is the arrangement central position O or the bow position of the ship 900, for example.

Figure 13:
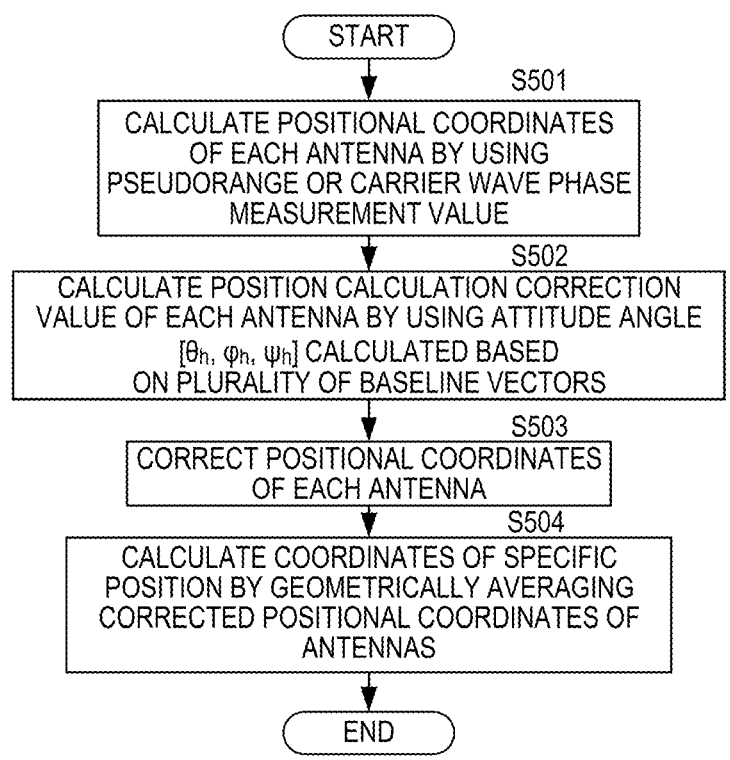
FIG. 13 is a flowchart of a position calculation according to the second embodiment of the present invention.

Next, the position calculating module 123 calculates the position along a flow. FIG. 13 is a flowchart of the position calculation of the second embodiment of the present invention.

First, the position calculating module 123 calculates the positional coordinates of each antenna position where either one of the pseudorange and the carrier wave phase measurement value is calculated (S501). Although the specific description of the calculation method of the positional coordinates is omitted since it is already known, by using the pseudorange, the positional coordinates can be calculated in the earlier stage of calculating the positional coordinates compared to using the carrier wave phase measurement value, and by using the carrier wave phase measurement value, the positional coordinates can be calculated more highly accurately compared to using the pseudorange.

The position calculating module 123 calculates a position calculation correction value for each antenna position by using the attitude angle $[\theta_h, \phi_h, \psi_h]$ calculated based on the plurality of baseline vectors as described above (S502).

The position calculating module 123 corrects the positional coordinates of each antenna position by using the position calculation correction value (S503).

The position calculating module 123 calculates the positional coordinates of the specific position by using the corrected positional coordinates at the respective antenna positions. Here, the position calculating module 123 calculates a geometric average value based on distances of the respective antenna positions from the specific position and calculates the positional coordinates of the specific position by using the geometric average value (S504).

By using the attitude angle described above, the position calculation correction value can be calculated highly accurately. Thus, a position calculation error due to the rocking of the ship can be suppressed highly accurately and the positional coordinates of the specific position can be calculated highly accurately.

Figure 14:
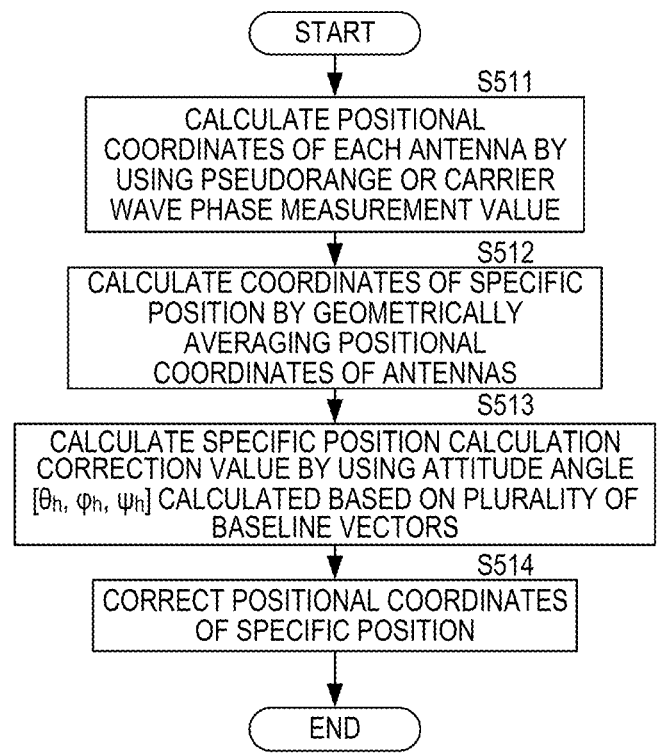
FIG. 14 is another flowchart of the position calculation according to the second embodiment of the present invention.

The position calculating module 123 may calculate the speed by the following method. FIG. 14 is another flowchart of the position calculation of the second embodiment of the present invention.

First, the position calculating module 123 calculates the positional coordinates of each antenna position where either one of the pseudorange and the carrier wave phase measurement value is calculated (S511).

The position calculating module 123 calculates the positional coordinates of the specific position by using a geometric average value which is based on distances of the respective antenna positions from the specific position (S512).

The position calculating module 123 calculates a position calculation correction value for the specific position by using the attitude angle $[\theta_h, \phi_h, \psi_h]$ calculated based on the plurality of baseline vectors as described above (S513).

The position calculating module 123 corrects the positional coordinates of the specific position by using the position calculation correction value for the specific position (S514).

Also with such a method, since the attitude angle described above is used, the position calculation correction value can be calculated highly accurately. Thus, a position calculation error due to the rocking of the ship can be suppressed highly accurately and the positional coordinates of the specific position can be calculated highly accurately.

Note that, also for the case of calculating the position, similar to the speed calculation described above, the correction illustrated in FIG. 12B, in other words, the correction according to the combination of the antennas where the carrier wave phase measurement value is successfully calculated, can be applied.

Figure 15:
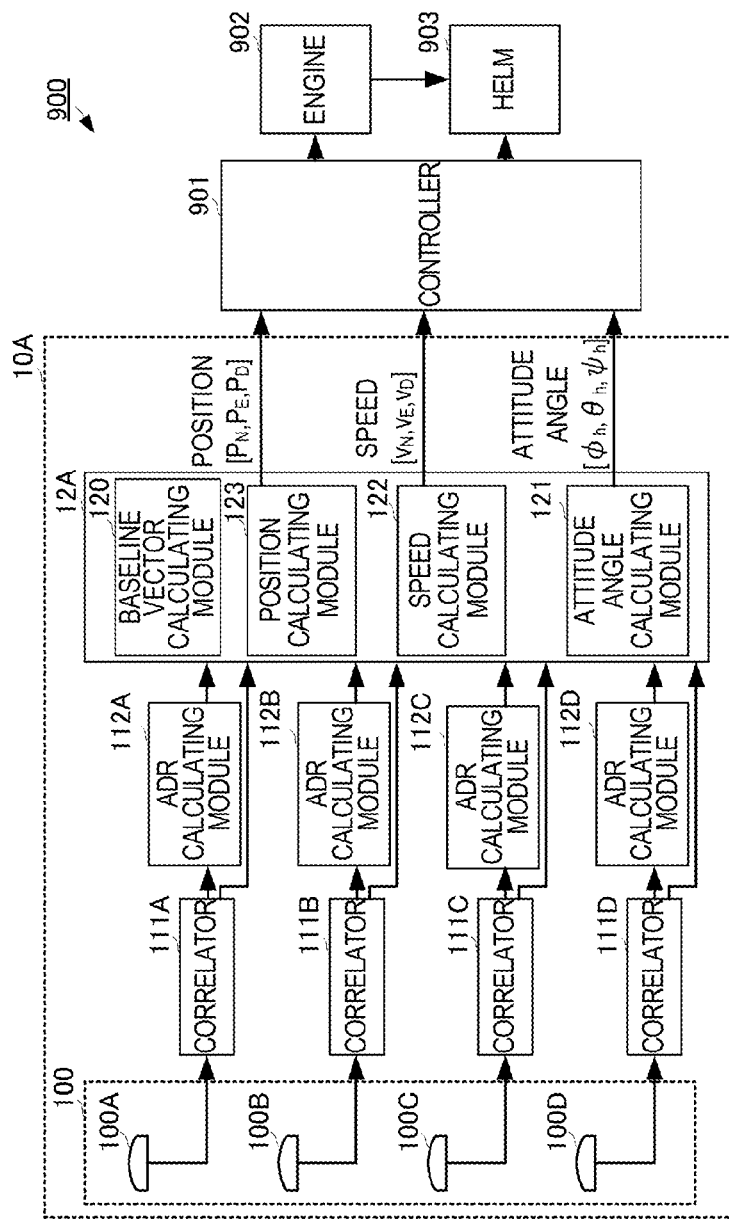
FIG. 15 is a block diagram illustrating a schematic configuration of a ship installed with the status calculating apparatus according to the second embodiment.

The status calculating apparatus described above can be used by being attached to the movable body, such as the ship 900, and the method and program for calculating the status can be used for the movable body. FIG. 15 is a block diagram illustrating a schematic configuration of the ship installed with the status calculating apparatus of the second embodiment. Note that, here, the ship 900 is described as an example of the movable body; however, the configuration of this embodiment can also be applied to other movable bodies on/in a water, movable bodies on land (e.g., an automobile), and movable bodies in the air (e.g., aircrafts).

The ship 900 includes a status calculating apparatus 10A, a controller 901, an engine 902, and a helm 903. The status calculating apparatus 10A calculates and outputs the position $[P_N, P_E, P_D]$, the speed $[V_N, V_E, V_D]$, and the attitude angle $[\theta_h, \phi_h, \psi_h]$ by using the above methods.

The controller 901 performs traveling control processing by using the position $[P_N, P_E, P_D]$, the speed $[V_N, V_E, V_D]$, and the attitude angle $[\theta_h, \phi_h, \psi_h]$. For example, the controller 901 performs an automatic traveling control for estimating the most efficient traveling course based on a current position of the ship and a destination, and a dynamic positioning control for stopping at a fixed position when the ship position is changing.

The controller 901 generates a control signal for the engine 902 and the helm 903 based on the set control contents. The engine 902 and the helm 903 operate based on the control signal.

With such a configuration, since the attitude angle, the position, and the speed are calculated highly accurately as described above, various controls can be achieved highly accurately. For example, the automatic traveling control can cause the ship 900 to automatically travel along the optimal traveling course. Moreover, by the dynamic positioning control, the dynamic positioning can be performed highly accurately.

Figure 16:
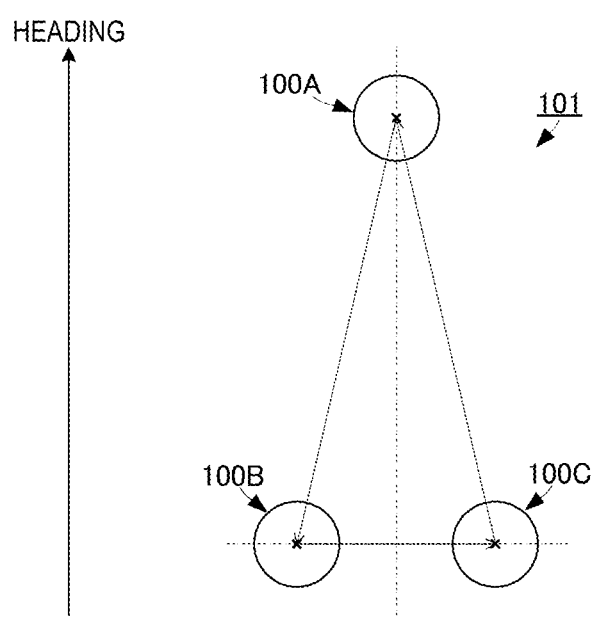
FIG. 16 is a view illustrating a pattern of derivative arrangement of a plurality of antennas.
Figure 17:
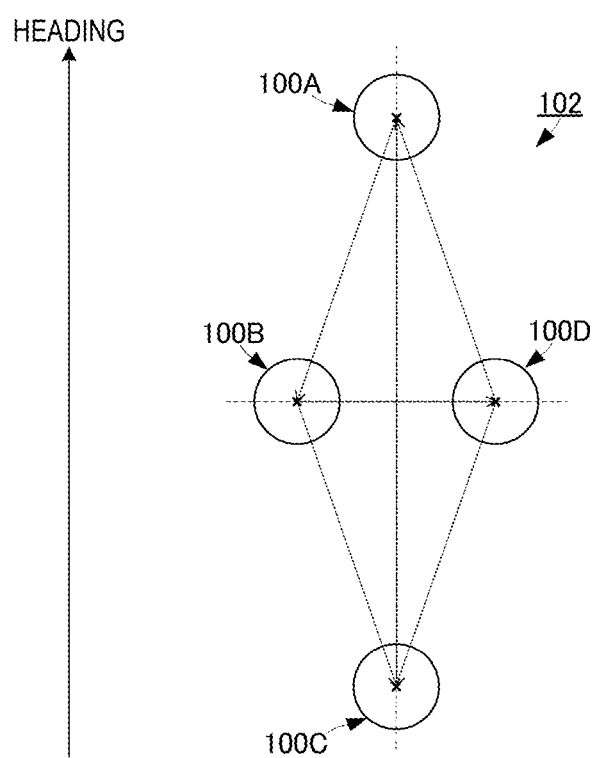
FIG. 17 is a view illustrating another pattern of the derivative arrangement of the plurality of antennas.
Figure 18:
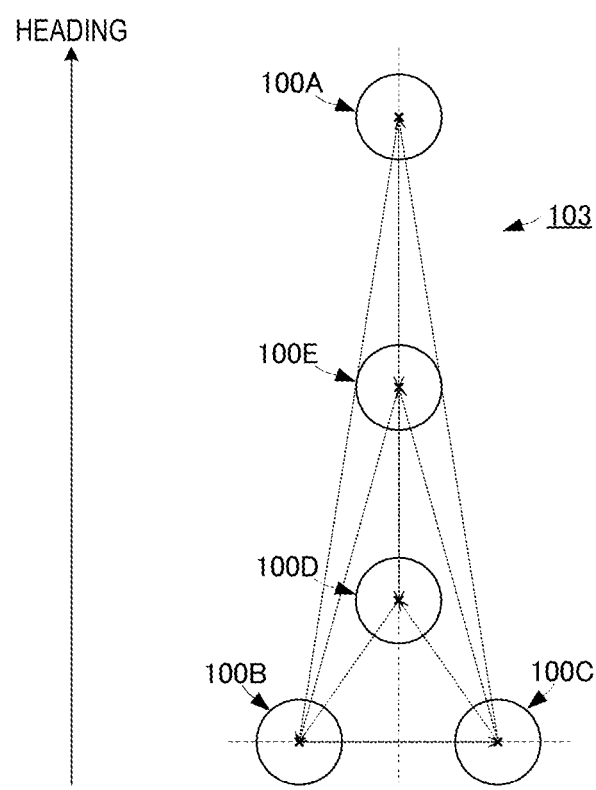
FIG. 18 is a view illustrating another pattern of the derivative arrangement of the plurality of antennas.

Note that, in the above description, the example in which the plurality of antennas are isotropically arranged is described; however, the following arrangement patterns may be used. FIGS. 16, 17 and 18 are views illustrating patterns of derivative arrangements of the plurality of antennas.

An antenna set 101 in FIG. 16 includes the three antennas 100A, 100B and 100C. The antenna 100A is arranged separated from the antennas 100B and 100C to the heading. The antennas 100B and 100C are arranged in the direction orthogonal to the heading. The antenna 100A is arranged on a perpendicular bisector of the position of the antenna 100B and the position of the antenna 100C. A distance between the position of the antenna 100B and the position of the antenna 100C is shorter than that between the position of the antenna 100A and the midpoint of the position of the antenna 100B and the position of the antenna 100C.

By using such an antenna arrangement, the baseline vector formed by the antennas 100A and 100B and the baseline vector formed by the antennas 100C and 100A become a long baseline vector in the heading. Therefore, since a plurality of baseline vectors that are long in the heading can be secured, the pitch and yaw angles $\theta$ and $\phi$ can be calculated highly accurately.

An antenna set 102 in FIG. 17 includes the four antennas 100A, 100B, 100C and 100D. The antennas 100A and 100C are arranged in the heading. The antennas 100B and 100D are arranged in the direction orthogonal to the heading. A distance between the position of the antenna 100A and the position of the antenna 100C is significantly longer than that between the position of the antenna 100B and the position of the antenna 100D. The midpoint of the position of the antenna 100A and the position of the antenna 100C coincides with the midpoint of the position of the antenna 100B and the position of the antenna 100D. Thus, the antenna set 102 includes the antennas 100A, 100B, 100C and 100D arranged in a rhombic shape of which a diagonal line parallel to the heading is longer than a diagonal line orthogonal to the heading.

By using such an antenna arrangement, the number of baseline vectors that are long in the heading can be increased. Thus, the pitch and yaw angles $\theta$ and $\phi$ can be calculated more highly accurately.

An antenna set 103 in FIG. 18 is the same as the antenna set 101 in FIG. 16 with additional antennas 100D and 100E. The antennas 100D and 100E are arranged on a perpendicular bisector of the position of the antenna 100B and the position of the antenna 100C. The antennas 100D and 100E are arranged between the position of the antenna 100A and the midpoint of the position of the antenna 100B and the position of the antenna 100C. In other words, the antennas 100A, 100D and 100E are arranged separated from each other in the heading.

By using such an antenna arrangement, the number of baseline vectors that are long in the heading can be increased. Thus, the pitch and yaw angles $\theta$ and $\phi$ can be calculated more highly accurately.

Note that, the antenna arrangements in FIGS. 16 and 18 may be a plane symmetric arrangement where a plane orthogonal to the heading is taken as a reference plane.

Moreover, the arrangement pattern of the antennas is not limited to the above examples. In a case of calculating a specific attitude angle component highly accurately, the plurality of antennas may be arranged to form a baseline vector having a long vector component in an axial direction included in two planes containing the specific attitude angle component.

Moreover, in the above description, the example in which the pitch, roll, and yaw angles $\theta$, $\phi$ and $\psi$, which are the respective components of the attitude angle, are calculated based on the baseline vectors is described. However, in a case of using an integrated system formed by integrating an attitude angle calculating module (or a positioning unit) that uses positioning signals with an IMU (Inertial Measurement Unit), the yaw angle may be calculated by the following method. The pitch and roll angles $\theta$ and $\phi$ are measured by an inertia sensor. The operator calculates the yaw angle by using the pitch and roll angles $\theta$ and $\phi$ measured by the inertia sensor and the baseline vectors based on the positioning signals. Moreover, it may be such that the pitch angle $\theta$ is measured by the inertia sensor and the roll and yaw angles $\phi$ and $\psi$ are sequentially calculated based on the pitch angle $\theta$ measured by the inertia sensor, and the baseline vectors.

Further, although a relationship between the distance between the antennas, in other words, the baseline length, and the wavelength of the positioning signal is not described above specifically, if the shortest baseline length is shorter than half the length of the wavelength of the positioning signal, the configuration of the present invention works more effectively.

Specifically, when the baseline length is shorter than half the length of the wavelength, although the determination of the integer value ambiguity becomes easy, since the baseline length is short, the calculation accuracy of the baseline vector is low. Thus, the accuracy of the attitude angle to be calculated becomes low, causing degradation of the accuracy in the operation as the attitude angle detecting sensor.

However, when using the configuration and processing of the present invention, since the attitude angle is calculated by using the plurality of baseline vectors, the accuracy of the attitude angle can be improved regardless of the baseline length. Therefore, even with the antenna arrangement which causes the baseline length to be shorter than half of the wavelength, the attitude angle can be calculated highly accurately. By having the baseline length of shorter than half of the wavelength, the determination of the integer value ambiguity becomes easy and the highly accurate attitude angle can be obtained swiftly. Moreover, the antenna interval can be shortened and the antenna set can be downsized.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A status calculating apparatus, comprising:
    three or more antennas disposed at different positions on a movable body, each antenna receiving a plurality of positioning signals;
    correlators configured to calculate carrier wave phase differences for every antenna based on correlation of the plurality of positioning signals with a replica signal of the positioning signal; and
    an information processing device configured to execute:
        carrier wave phase measurement value calculating modules configured to calculate carrier wave phase measurement values, each carrier wave phase measurement value being an integrated value of the carrier wave phase differences;
        a baseline vector calculating module configured to calculate a plurality of baseline vectors based on the carrier wave phase measurement values; and
        an attitude angle calculating module configured to:
            calculate, by using two of the plurality of baseline vectors as a pair, a pitch angle for every pair,
            calculate a representative pitch angle based on the calculated pitch angles, and
            calculate a representative yaw angle based on the representative pitch angle and a baseline vector, as an attitude angle.

2. The status calculating apparatus of claim 1, wherein the attitude angle calculating module calculates the representative yaw angle for every baseline vector based on the representative pitch angle and a representative roll angle, the representative pitch angle and the representative roll angle being the attitude angle.

3. The status calculating apparatus of claim 2, wherein the attitude angle calculating module calculates a roll angle for every baseline vector based on the representative pitch angle, and calculates the representative roll angle based on the plurality of calculated roll angles.

4. The status calculating apparatus of claim 1, wherein the three or more antennas are arranged such that at least one of the plurality of baseline vectors becomes parallel to a heading of the movable body.

5. The status calculating apparatus of claim 4, wherein a length of the baseline vector parallel to the heading is short among the plurality of baseline vectors.

6. The status calculating apparatus of claim 4, wherein the attitude angle calculating module calculates the representative yaw angle based on the representative pitch angle and a baseline vector which is parallel to the heading of the movable body.

7. The status calculating apparatus of claim 1, wherein the three or more antennas are arranged on the movable body such that distances from the center of the arranged positions of the three or more antennas to the respective antennas become the same as each other.

8. The status calculating apparatus of claim 1, wherein the baseline vector having the shortest length among the plurality of baseline vectors is shorter than half of a wavelength of the positioning signal.

9. The status calculating apparatus of claim 1, wherein the information processing device is further configured to execute:
    a position calculating module configured to calculate coordinates of a specific position of the movable body by using the attitude angle and the correlation results of the plurality of positioning signals, and wherein in calculating the coordinates of the specific position, the position calculating module corrects the results of the plurality of positioning signals by using the attitude angle.

10. The status calculating apparatus of claim 1, wherein the information processing device is further configured to execute:

a speed calculating module configured to calculate a speed of the specific position of the movable body by using the attitude angle and the correlation results of the plurality of positioning signals, and wherein in calculating the speed of the specific position, the speed calculating module corrects the results of the plurality of positioning signals by using the attitude angle.

11. A movable body, comprising:

the status calculating apparatus of claim 1; and a controller configured to perform a movement control of the movable body by using the attitude angle outputted from the status calculating apparatus.

12. A method of calculating a status, comprising:

receiving three or more positioning signals at different positions on a movable body;

calculating carrier wave phase differences for every different position based on correlation of the three or more positioning signals with a replica signal of the positioning signal, and calculating carrier wave phase measurement values, each carrier wave phase measurement value being an integrated value of the carrier wave phase differences;

calculating a plurality of baseline vectors based on the carrier wave phase measurement values;

calculating, by using two of the plurality of baseline vectors as a pair, a pitch angle for every pair;

calculating a representative pitch angle based on the calculated pitch angles; and calculating a representative yaw angle based on the representative pitch angle and a baseline vector, as an attitude angle.

13. The status calculating method of claim 12, wherein calculating the representative yaw angle includes calculating the yaw angle for every baseline vector based on the representative pitch angle and a representative roll angle, the representative pitch angle and the representative roll angle being the attitude angle.

14. The status calculating method of claim 13, wherein calculating the representative yaw angle includes calculating a roll angle for every baseline vector based on the representative pitch angle, and calculates the representative roll angle based on the plurality of calculated roll angles.

15. The status calculating method of claim 12, further comprising calculating coordinates of a specific position of the movable body by using the attitude angle and the correlation results of the plurality of positioning signals, and wherein calculating the coordinates of the specific position further includes correcting the results of the plurality of positioning signals by using the attitude angle.

16. The status calculating method of claim 12, further comprising calculating a speed of the specific position of the movable body by using the attitude angle and the correlation results of the plurality of positioning signals, and wherein calculating the speed of the specific position further includes correcting the results of the plurality of positioning signals by using the attitude angle.

* * * * *